Oct. 13, 1942.  J. HOLLAND-LETZ  2,298,482
LIQUID PRESSURE CONTROL FOR ROUGHAGE MILLS
Filed June 2, 1939  2 Sheets-Sheet 1
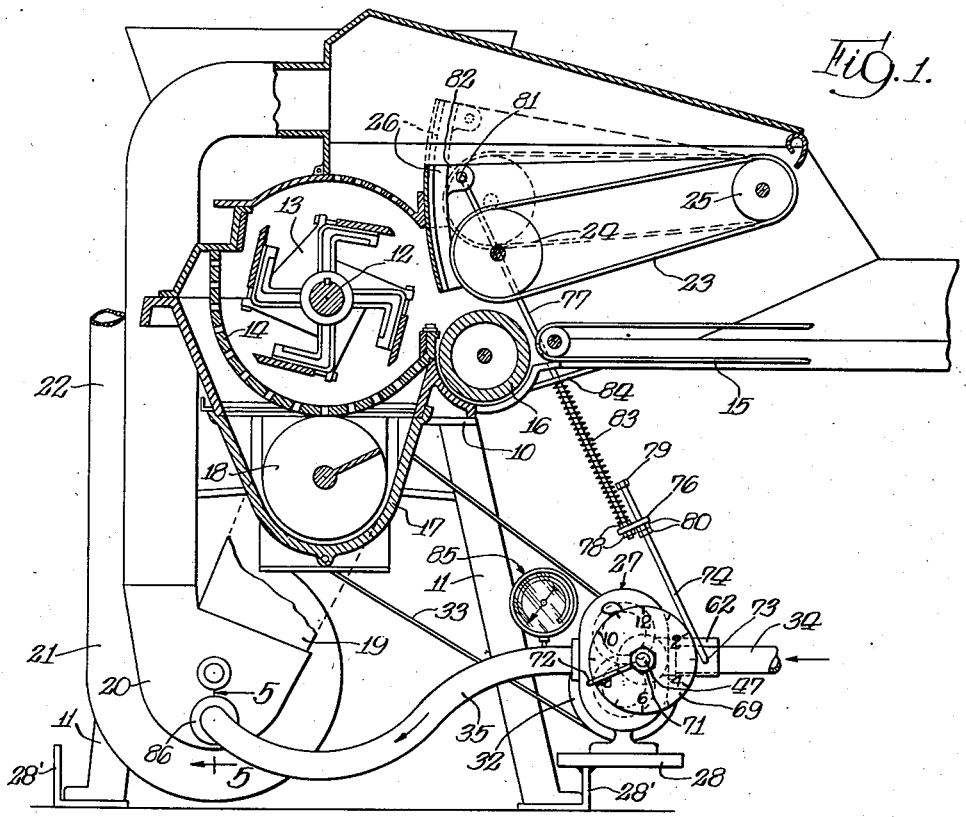
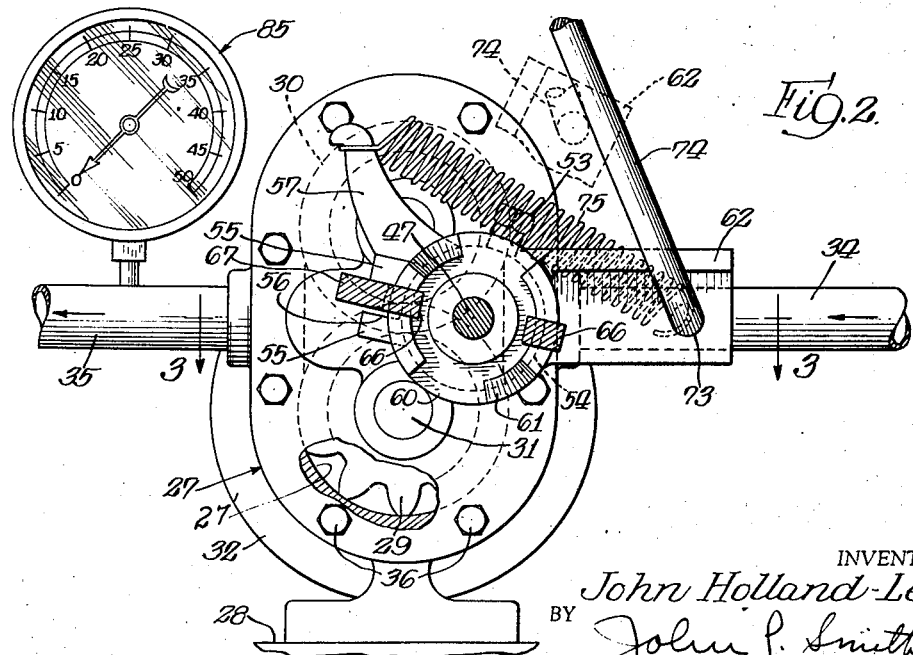
INVENTOR.
John Holland-Letz,
BY John P. Smith
ATTORNEY.

Oct. 13, 1942.    J. HOLLAND-LETZ    2,298,482
LIQUID PRESSURE CONTROL FOR ROUGHAGE MILLS
Filed June 2, 1939    2 Sheets-Sheet 2
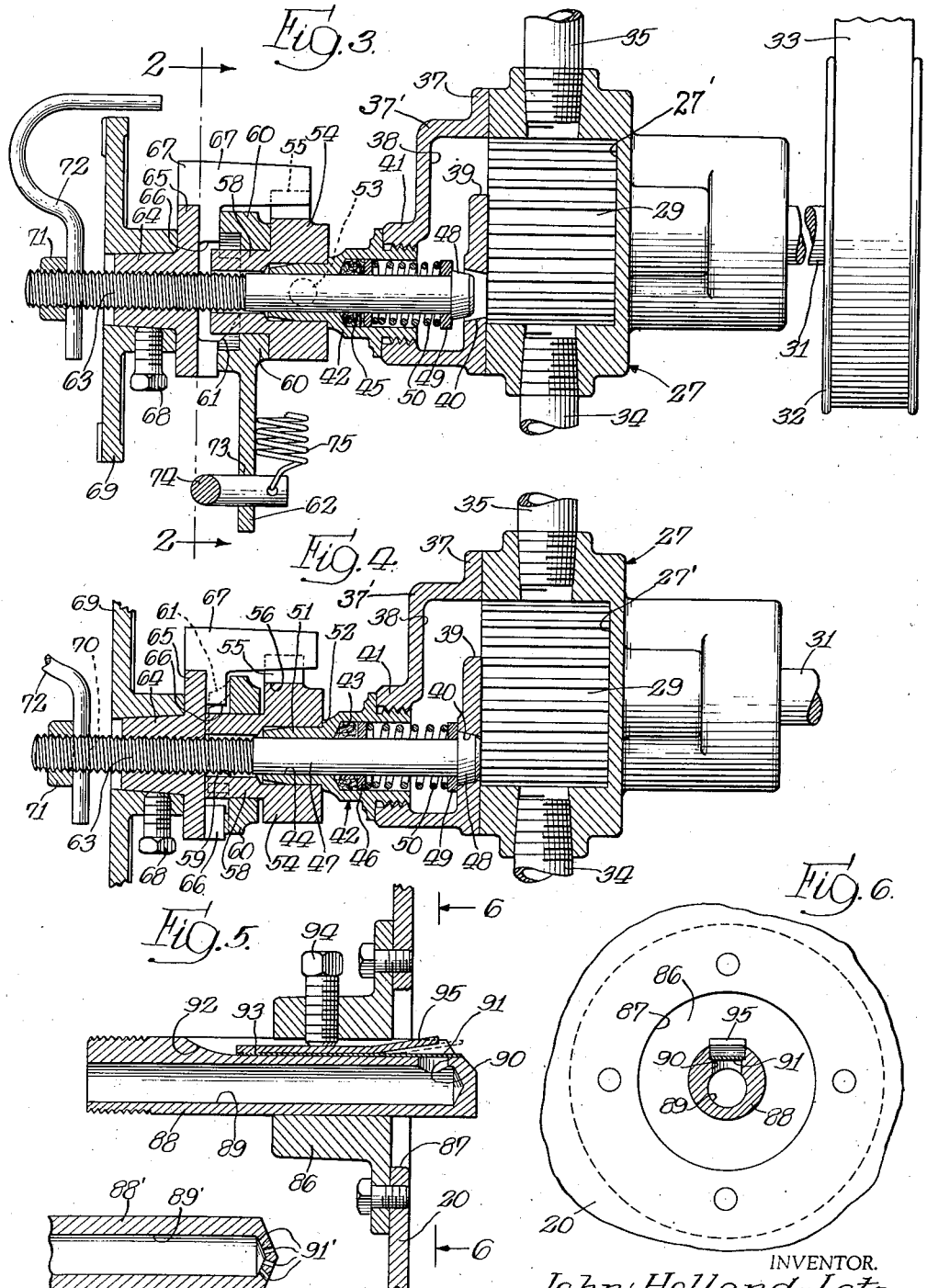
INVENTOR.
John Holland-Letz.
BY John P. Smith
ATTORNEY.

Patented Oct. 13, 1942

2,298,482

UNITED STATES PATENT OFFICE 2,298,482

LIQUID PRESSURE CONTROL FOR ROUGHAGE MILLS

John Holland-Letz, Crown Point, Ind., assignor to The Letz Manufacturing Company, a corporation of Indiana Application June 2, 1939, Serial No. 277,045

8 Claims. (Cl. 146—109)

The present invention relates generally to roughage mills, but more particularly to an automatic pressure control means associated with the roughage mill for accurately supplying and automatically controlling the amount of liquid mixed with the roughage during the time it is being comminuted in the roughage mill.

Heretofore unsatisfactory attempts have been made to automatically control the supply of liquid mixed with the silage prepared by an ensilage cutter. In these attempts no effort was made either to maintain a pressure on the liquid or adjustments provided for regulating the pressure to be thus maintained so that under the circumstances either not enough liquid was supplied when the ensilage cutter was running at full capacity or in some instances too much liquid was supplied when the ensilage cutter was operating at little or no capacity.

It is therefore one of the primary objects of the present invention to not only overcome the difficulty heretofore pointed out, but to provide a novel and improved automatic liquid pressure control for roughage mill in which a predetermined amount of liquid will be supplied to the roughage mill proportionately commensurated with the material comminuted.

A further object of the invention is to provide a novel and improved liquid pressure control for roughage mill which is primarily designed for automatically supplying such liquids as molasses in which the viscosity of the same varies in the different types of molasses used and by the temperature at the time it is being supplied. With these factors in mind, it is a further object of the invention to provide a novel and plurality of essential adjustments to overcome these difficulties and to provide an accuracy in the supply of molasses in predetermined amounts directly in proportion to the amount of material being comminuted.

A still further object of the invention is to provide a novel and improved molasses pressure control for roughage mills in which a pump is operatively associated with the feeding mechanism of the mill so that the pressure exerted on the molasses discharged through a nozzle is directly controlled by the material passing through the mill.

A still further object of the invention is to provide a novel and improved automatic pressure control for the discharge of molasses in the preparation of forage by a roughage mill in which the pressure on the molasses in the discharge conduit is immediately reduced to zero the instant no further material is being conveyed to the cutter head of the roughage mill.

These and other objects are accomplished by providing a construction and an arrangement of the various parts in the manner hereinafter described and particularly pointed out in the appended claims.

Referring to the drawings:

Fig. 1 is a fragmentary and partially cross-sectional view of a more or less conventional roughage mill having my invention embodied therein;

Fig. 2 is an enlarged cross sectional view taken on the line 2—2 in Fig. 3;

Fig. 3 is a cross sectional view taken on the line 3—3 in Fig. 2;

Fig. 4 is a similar cross sectional view showing the position of the control valve when the pump is being actuated to generate pressure on the liquid discharge conduit;

Fig. 5 is a cross sectional view taken on the line 5—5 in Fig. 1 illustrating the construction of the nozzle mechanism;

Fig. 6 is a cross sectional view taken on the line 6—6 in Fig. 5; and

Fig. 7 is a longitudinal cross sectional view of a modified construction of a discharge nozzle.

In illustrating one form of my invention I have shown the same in connection with a more or less conventional roughage mill which comprises a main frame 10 mounted on supporting legs 11. Mounted on the main frame in suitable bearings is a main drive shaft 12 to which is secured and rotatable therewith a rotary cutter head 13. Located below the cutter head 13 is the usual perforated grate or screen 14. Positioned to one side of the cutter head for feeding material thereto is the usual endless conveyor 15. Positioned adjacent the delivery end of the endless conveyor 15 is an idle feed roller 16. Positioned below the screen or grate 14 is a conveyor trough 17 in which is mounted on suitable bearings a conveyor screw 18. Communicating with the discharge end of the conveyor trough is a conduit 19 which in turn has its lower end communicating with an elbow 20 to an elevating or blower fan housing 21. The delivery end of the fan housing 21 is connected by a conduit 22 for delivering the comminuted material to storage place such as a mow or hayloft. Positioned above the delivery end of the endless conveyor belt 15 and above the idle feed roller 16 is a supplemental floating feed belt 23 which is trained about the rollers 24 and 25. This feed belt 23 together with its associated rollers 24 and 25 are mounted within a frame generally indicated by the reference character 26. This frame 26 and the feed belt 23 together with the inner roll 24 are adapted to float up and down so as to compress the material and insure positive feed of the material into the cutter head.

One of the essential features of the present invention embodies a control mechanism actuated by the floating feed mechanism so that the pressure for forcing the molasses into the mixing and elevating fan housing is accurately controlled in direct proportion to the amount of material being fed into the roughage mill. This novel pressure control mechanism comprises a pump generally indicated by the reference character 27 which is mounted on and supported by a base or frame member 28 which in turn is secured to one of the slide or skid members 28' of the legs 11 of the mill. The pump in this instance comprises a housing having an internal recess therein as shown at 27' in which are mounted a lower pump gear 29 which in turn meshes with and operatively drives an upper pump gear 30. The lower pump gear 29 is secured to a shaft 31 to the outer end of which is secured a pulley wheel 32. The pulley wheel 32 and pump proper is driven by a belt 33 which in turn is trained about the pulley 32 and a pulley wheel (not shown) secured to the shaft of the conveyor 18 (see Fig. 1). Communicating with one side of the pump housing 27 at a point substantially midway between the two pump gears 29 and 30 is a molasses supply line or pipe 34. Communicating with the pump housing at a point directly opposite the supply line is a discharge conduit or pipe 35. Secured to one side of the pump housing 27 by means of bolts 36 is a plate 37 which is provided with a horizontally and laterally extending portion 37'. Located in the portion 37' is a transverse liquid by-pass or recess as shown at 38. This recess or by-pass 38 has an opening as shown at 39 communicating with the inner chamber 27' of the pump housing 27 at a point adjacent one side of and between the two pump gears 29 and 30. The other side of the by-pass or recess 38 communicates with the inner chamber 27' of the pump housing 27 at a point on the opposite side of the pump through a port or valve seat indicated by the reference character 40. Formed integrally with the horizontal portion 37' of the plate 37 adjacent one end of the by-pass 38 is an internally threaded collar portion 41 in which is mounted in threaded engagement therewith an externally threaded sleeve generally indicated by the reference character 42. This sleeve 42 has a relatively enlarged circular recess 43 at its inner end and a relatively reduced longitudinal bore 44 at its outer end. The lower portion of the enlarged bore 43 of the sleeve 42 is provided with packing 45 and a washer 46 located adjacent thereto. Reciprocally mounted in a reduced bore 44 of the sleeve 42 is a valve stem 47. Formed on the inner end of the valve stem 47 is a tapered valve or head 48 which is adapted to seat itself on the complementary valve seat or port 40 in the plate 37. Engaging the head or valve 48 is a washer 49. Mounted between the washer 49 and the washer 46 and embracing the valve stem 47 is a spring 50. It will be obvious that the function of the spring is to force the valve head 48 upon its seat 40 for closing the communication from one side of the pump to the other through the by-pass 38. The sleeve 42 has an outwardly projecting reduced extension 51 forming a shoulder as shown at 52. Adjustably secured to the extension 51 of the sleeve 42 by means of a set screw 53 is a collar 54. The collar 54 is provided with two laterally spaced apart lugs 55 forming a recess 56 therebetween for the purpose hereinafter pointed out. Formed integrally with and extending substantially radially with respect to the axis of the collar 54 is a spring connecting arm 57 (see Fig. 2). Formed integrally with the collar 54 and extending outwardly therefrom is a barrel or sleeve extension 58. The sleeve or barrel extension 58 is provided with a longitudinal bore 59 which loosely engages the valve stem 47. Loosely and oscillatably mounted on the barrel extension 58 of the collar 54 is a cam washer 60. Extending outwardly from and at diametral opposite positions of the washer 60 are camming or bevelled surfaces 61. Extending laterally from and formed integrally with the camming washer 60 is a lever arm 62. The outer extended half portion of the valve stem 47 is threaded as shown at 63 and mounted in threaded engagement with the threaded portion of the stem 47 is a cone-like sleeve 64. The inner end of the cone-like sleeve has a disc-like portion 65 formed integrally therewith. Formed integrally with and at the diametrically opposite portions of the disc 65 and located in the path of the camming surfaces 61 of the collar 60 are radially disposed lugs 66. Formed integrally with and on the periphery of the disc 65 is a horizontally projecting finger 67. This finger 67 projects into the recess 56 between the lugs 55 of the collar 54 (see Figs 3 and 4). Secured to the tapered sleeve portion 64 by means of a set screw 68 is a disc or dial indicator 69. The dial indicator 69 is divided into twelve divisions graduated or numbered in clock-wise direction as viewed in Fig. 1 of the drawings for the purpose hereinafter described. The outer end of the valve stem 46 is provided with a transverse aperture 70 in which is secured by means of a threaded nut 71, a bale-like member 72 which serves as a crank for revolving the valve stem in the threaded collar 64 for adjusting the valve head 48 with respect to its seat 40. The bale 72 also performs the function of a pointer or indicator on the numerals on the disc 69 so that when the bale is revolved in clockwise direction, the valve head 48 will be actuated closer to its operating seat, indicating that a greater pressure will be generated by the pump with a consequent greater amount of molasses supplied to a lesser amount of material being fed into the roughage mill. If the bale is operated in the reverse direction, a lesser pressure will be exerted by the pump with a consequent lesser amount of molasses supplied in proportion to the amount of material fed into the mill.

Pivotally connected in the bore 73 in the lever 62 is a link or rod 74. Mounted between the lever 57 and the lever 62 is a spring 75. The upper end of the rod 74 slidably extends through an aperture in a plate 76 secured to the lower end of the rod 77 between two nuts 78. The rod 74 has in effect a lost motion connection with respect to the rod 77 by the arrangement of the spaced apart nuts 79 and 80. The upper end of the rods 77 is pivotally connected as shown at 81 to an ear 82 on a floating frame member 26 of the endless belt 23 of the roughage mill. An extension spring 83 is mounted on the lower end of the rod 77 so that the upper end thereof engages the frame structure of the mill as shown at 84 for normally returning the rod to its lowermost position and with it the floating apron or belt 23. Located on the pressure side of the pump and in the conduit 35 leading from the pump to the mixing fan casing 21 is a pressure gauge generally indicated by the reference character 85 for indicating the pressure built up in the conduit 35 so that an operator may accurately determine the amount of liquid being discharged from the nozzle during the operation of the roughage mill.

Another novel feature of the present invention includes a nozzle construction which discharges the liquid or molasses to the fan housing of the roughage mill. This mechanism includes a flanged collar 86 which is secured concentrically with respect to an opening 87 in the housing 20. The nozzle specifically comprises a shaft-like member 88 having a longitudinal bore as shown at 89 which terminates short of its inner end, but is provided with an inwardly projecting bore or port as shown at 90. This port 90 is normally closed by a flat spring 91 seated in the longitudinally extending groove or recess 92 of the nozzle 88. The spring 91 is secured to the recess 92 by a metal strip 93 and a set screw 94. The set screw 94 is mounted in threaded engagement with the bore in the flanged collar 86. This flanged collar 86 and set screw 94 also secures in position the nozzle 88 and prevents its displacement therefrom. The inner end of the plate 93 is bent upwardly as shown at 95 so as to limit the upward movement of the spring 91 in its function of discharging the liquid or molasses therefrom. The outer end of the nozzle is, of course, suitably attached to the conduit 35 leading from the pump.

In Fig. 7 of the drawings I have illustrated a modified form of nozzle I prefer to employ in extremely cold weather which comprises a cylindrical member 88' having a longitudinal bore 89' terminating short of the inner end. The inner end of the nozzle is provided with a plurality of angularly disposed apertures or bores 91' of relatively small diameter so as to discharge the molasses in a plurality of differently directed streams so as to effect a wider distribution and a more thorough mixing of the liquid with the comminuted forage.

Summarizing the features, functions of operation of my improved liquid pressure and distributing control mechanism for roughage mill, let us assume that the operative parts of the roughage mill as well as the adjustment of the valve and pump are in the position shown in Figs. 1, 2 and 3, and let us also assume that the mill is being operatively driven by belt pulley power which means that the cutter head 13 is revolving, the endless aprons 15 and 23 are operating in the direction to feed material therebetween into the cutter head and the drive belt 33 is operating on the pulley 32 of the pump to drive the pump gears 29 and 30. The floating feed belt 23 and its associated frame 26 is in its lowermost position since no material is being fed to the cutter head or the roughage mill. When in this position, it will be observed that the connecting rod 77 connected to the floating frame 26 is in its lowermost position so that the plate 76 carried at the lower end thereof depresses the rod 74 and holds the lever 62 in its lowermost position or the position shown in Figs. 2 and 3 of the drawings, the valve head 48 is unseated from its seat 49 in the plate 37, thereby opening up the by-pass 38 which establishes communication between the discharge side and the incoming side of the pump. In other words, the opening of the valve permits the pump to continue its operation merely of circulating the liquid through the by-pass and within the pump without creating any pressure on the pressure gauge 85 or in the conduit 35 through which the liquid is normally discharged into the fan housing 21. When material is placed on the endless apron 15 it is conveyed inwardly towards the cutter head 13. This incoming material will raise the inner end of the floating belt 23, thereby raising the rod 77 and its attached plate 76 upwardly so as to take pressure off the rod 74. At this instance the spring 75 will contract so as to actuate the lever 62. The actuation of the lever 62 in turn will revolve the camming collar 60 on the sleeve 58 so that the camming surfaces 61 will begin to ride down the opposite lugs 66 on the disc 65. This movement permits the valve spring 50 to actuate the valve 47 to approach its seat 49 in the by-pass 38 of the pump and the pressure in the discharge conduit 35 will begin to rise and will be indicated by the pressure gauge 85 connected to the conduit 35. If the material placed on the conveyor 15 is of sufficient amount to further raise the floating apron 23, the plate 76 on the rod 77 will engage the nut 79 to further actuate the lever 62 so that the camming surfaces 61 are actuated beyond the lugs 66 or to the position shown in Fig. 4 in which case the valve head 48 will completely close the by-pass 38 and the full pressure of the pump will then be made use of because all of the liquid passing through the pump is then being discharged while none of it is going through the by-pass.

A variety of adjustments are provided whereby the operator may increase or decrease the amount of liquid or molasses discharged into the comminuted material so that the proportion of molasses or liquid is decreased or increased in proportion to the material reduced. This means includes the crank and indicator 72 which is rigidly attached to the outer end of the valve stem 47. For example, should the operator desire to increase the amount of molasses being discharged or to maintain a higher pressure in the discharge tube 35 so that the proportion of molasses discharged is increased with respect to the amount of material comminuted, the lever 72 is turned in a clock-wise direction, or in a direction where the numbers are consecutively increased as viewed on the disc 69 in Fig. 1 of the drawings. The valve head 48 will be moved to a position more closely approaching its seat 49 in the pump housing to thereby lessen the amount of liquid being by-passed on the initial lift or raising motion of the endless apron 23 when the material is being fed between it and its associated conveyor 15. Should the operator desire a lesser amount of liquid or molasses to be fed in proportion to the material comminuted, then the crank 72 is turned in a counterclockwise direction as viewed in Fig. 1, thereby moving the valve head a further distance from its seat. The latter adjustment is sometimes essential in cold weather where the viscosity of the material is such that it does not flow easily and therefore requires a larger opening to permit the same to flow through the by-pass.

From the above description it will be readily seen that the floating apron 23 not only automatically controls the pressure to be maintained on the liquid or molasses discharge tube so that it discharges the molasses in predetermined amounts in direct proportion to the material comminuted, but that it also automatically shuts off the pressure and in consequence shuts off the discharge of molasses immediately when no material is fed between the conveyor 15 and floating apron or belt 23. In this connection it will be noted that even though the pressure is shut off the pump continues to actuate, because the liquid is being by-passed through the pump so that the pressure is reduced to a minimum or zero. It will also be observed that the pump actually creates a vacuum or suction so as to retain or withdraw the liquid or molasses in the discharge tube 35 and thereby prevent any dripping or draining into the fan housing as is occasioned by similar devices heretofore constructed.

Further adjustments are provided so as to make the controls more accurately responsive to the variation in the amount of materials passing through the mill. Such variations may be made by adjusting the plates 76 on the rod 77 as well as adjusting the nut 79 and 80 with respect to the rod 74. In this connection it will also be observed that the collar 54 may be adjusted and set by the set screw 53 so as to increase or decrease the tension of the spring 75 in effectively varying the spring tension so as to be more responsive to the amount or size of the material passing between the cooperative aprons in determining the instant when the pump is to become effective to reduce the pressure in the liquid discharge pipe 35.

The discharge nozzle illustrated in Fig. 5 is provided with a flat spring which normally covers the discharge port 90 so as to maintain a slight pressure thereon and effect a spraying of the liquid or molasses passing therethrough. In the modified form of the nozzle shown in Fig. 7 a plurality of angularly disposed and relatively small ports or apertures are provided so as to discharge the liquid or molasses in a plurality of different streams. This particular nozzle is very effective for spraying the liquid in cold weather.

While in the above specification I have described one embodiment which my invention may assume in practice, it will of course be understood that the same is capable of modification and that modification may be made without departing from the spirit and scope of the invention as expressed in the following claims.

What I claim is my invention and desire to secure by Letters Patent:

1. The combination with a roughage mill having a conveying feeding belt, a supplemental feeding belt positioned above said first named belt, a conduit for supplying a liquid to the material comminuted by said mill, a pump in said conduit and driven by said mill, a by-pass in said pump connecting the inlet and outlet sides of said pump together, a valve for controlling the passage of liquid through said by-pass, and means for operatively controlling said valve by said supplemental feeding belt.

2. The combination with a roughage mill having a conveying feeding belt, a supplemental feeding belt positioned above said first named belt, a conduit for supplying a liquid to the material comminuted by said mill, a pump in said conduit for supplying a liquid to the material comminuted by said mill, a pump in said conduit and driven by said mill, a by-pass in said pump connecting the inlet and outlet sides of said pump together, a valve for controlling the passage of liquid through said by-pass, and a lever operatively connected to said valve and connected to said supplemental feeding belt whereby the pressure created by said pump is controlled by the material fed by said supplemental feed belt.

3. The combination with a roughage mill having a conveying feed belt, a supplemental floating feeding mechanism associated with said feed belt, a liquid conduit for supplying a liquid to the material comminuted by said mill, a liquid pressure pump mounted in said conduit and driven by said mill, a by-pass in said pump connecting the discharge side with the intake side, a reciprocal valve mounted in said pump for controlling the passage of liquid through said by-pass, a cam actuated lever mounted on said pump and operatively connected to said valve, and means for operatively connecting said lever with said supplemental feeding mechanism whereby the pressure on said liquid is controlled by the position of said supplemental feeding mechanism.

4. The combination with a roughage mill having a conveying feed belt, a supplemental floating feeding mechanism associated with said feed belt, a liquid conduit for supplying a liquid to the material comminuted by said mill, a liquid pressure pump mounted in said conduit and driven by said mill, a by-pass in said pump connecting the discharge side with the intake side, a reciprocal valve mounted in said pump for controlling the passage of liquid through said by-pass, a cam actuated lever mounted on said pump and operatively connected to said valve, means for operatively connecting said lever with said supplemental feeding mechanism whereby the pressure on said liquid is controlled by the position of said supplemental feeding mechanism, and means for adjusting said valve for varying the pressure created by said pump.

5. The combination with a roughage mill having a conveying feed belt, a supplemental floating feeding mechanism associated with said feed belt, a liquid conduit for supplying a liquid to the material comminuted by said mill, a liquid pressure pump mounted in said conduit and driven by said mill, a by-pass in said pump connecting the discharge side with the intake side, a valve seat formed in one end of said by-pass, a valve stem mounted in said pump having a head adapted to seat on said valve seat for controlling the passage of liquid through said by-pass, a spring normally closing said valve, a cam lever journaled on said valve stem, a collar in which said valve stem is adjustably secured, and operative connections between said lever and said supplemental feeding mechanism for controlling the pressure created by said pump.

6. The combination with a roughage mill having a conveying feed belt, a supplemental floating feeding mechanism associated with said feed belt, a liquid conduit for supplying a liquid to the material comminuted by said mill, a liquid pressure pump mounted in said conduit and driven by said mill, a by-pass in said pump connecting the discharge side with the intake side, a valve seat formed in one end of said by-pass, a valve stem mounted in said pump having a head adapted to seat on said valve seat for controlling the passage of liquid through said by-pass, a spring normally closing said valve, a cam lever journaled on said valve stem, a collar in which said valve stem is adjustably secured, operative connections between said lever and said supplemental feeding mechanism for controlling the pressure created by said pump, and a crank secured to said valve stem for adjusting the position of said valve head with respect to its seat for varying the amount of liquid discharged with respect to the amount of material comminuted.

7. The combination with a roughage mill having a conveying feeding belt, a supplemental feeding belt positioned above said first named belt, a conduit for supplying a liquid to the material comminuted by said mill, a pump in said conduit and driven by said mill, a by-pass connecting the inlet and outlet sides of said pump together, a valve for controlling the passage of liquid through said by-pass, and means for operatively controlling said valve by said supplemental feeding belt.

8. The combination with a roughage mill having a conveying feeding belt, a supplemental feeding belt positioned above said first named belt, a conduit for supplying a liquid to the material comminuted by said mill, a pump in said conduit and driven by said mill, means for by-passing the liquid from a point adjacent the discharge side of said pump to a point adjacent the inlet side of said pump, a valve for controlling the passage of liquid through said means, and means for operatively controlling said valve by said supplemental feeding belt.

JOHN HOLLAND-LETZ.